(12) United States Patent
Reiter et al.

(10) Patent No.: US 9,731,790 B2
(45) Date of Patent: *Aug. 15, 2017

(54) CHAINRING

(71) Applicant: SRAM, LLC, Chicago, IL (US)

(72) Inventors: Markus Reiter, Schweinfurt (DE); Raymond Florczyk, Schwebheim (DE); Henrik Braedt, Gebrunn (DE)

(73) Assignee: SRAM, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/929,892

(22) Filed: Nov. 2, 2015

(65) Prior Publication Data

US 2016/0052599 A1 Feb. 25, 2016

Related U.S. Application Data

(63) Continuation of application No. 13/311,735, filed on Dec. 6, 2011, now Pat. No. 9,182,027.

(51) Int. Cl.
*F16H 55/30* (2006.01)
*F16H 7/06* (2006.01)
(Continued)

(52) U.S. Cl.
CPC .............. *B62M 9/105* (2013.01); *B62M 1/36* (2013.01); *B62M 9/00* (2013.01); *B62M 9/08* (2013.01);
(Continued)

(58) Field of Classification Search
CPC ........ F16H 55/30; F16H 7/06; F16H 57/0006; F16H 55/303; B62M 9/105
(Continued)

(56) References Cited

U.S. PATENT DOCUMENTS 257,445 A * 5/1882 Lechner .................... F16H 7/06
474/152
431,529 A * 7/1890 Redlinger ................ B62M 9/08
188/27
(Continued)

FOREIGN PATENT DOCUMENTS

DE 2816137 A1 10/1979
EP 0034445 A2 8/1981
(Continued)

OTHER PUBLICATIONS

"Japanese Industrial Standard," Sections D 9415-1993 and D 9417-1993.

*Primary Examiner* — Henry Liu
(74) *Attorney, Agent, or Firm* — Milan Milosevic; Lisa Serdynski (57) ABSTRACT

A bicycle chainring includes a plurality of teeth extending from a periphery of the chainring wherein roots of the plurality of teeth are disposed adjacent the periphery of the chainring. The plurality of teeth include a first group of teeth and a second group of teeth, each of the first group of teeth wider than each of the second group of teeth, and at least some of the second group of teeth arranged alternatingly and adjacently between the first group of teeth, wherein the center of a top land of at least some of the first and second groups of teeth are offset from a plane in a direction toward one of the inboard and outboard sides of the chainring.

28 Claims, 9 Drawing Sheets

(51) Int. Cl.
*B62M 9/10* (2006.01)
*B62M 1/36* (2013.01)
*B62M 9/00* (2006.01)
*B62M 9/08* (2006.01)

(52) U.S. Cl.
CPC .......... *F16H 55/30* (2013.01); *F16H 55/303* (2013.01); *B62M 2009/002* (2013.01); *Y10T 74/2165* (2015.01)

(58) Field of Classification Search
USPC ................................................. 474/152, 156
See application file for complete search history.

(56) References Cited

U.S. PATENT DOCUMENTS

| | | | |
|---|---|---|---|
| 495,584 A | 4/1893 | Guthrie | |
| 513,589 A * | 1/1894 | Metz | F16H 7/06 280/236 |
| 515,449 A * | 2/1894 | Scovell | 280/236 |
| 528,145 A * | 10/1894 | Carr | F16H 7/06 474/141 |
| 530,058 A * | 11/1894 | Schaum et al. | F16H 7/06 280/236 |
| 536,813 A | 4/1895 | MacPhail | |
| 556,254 A | 3/1896 | Dake | |
| 568,862 A * | 10/1896 | Miehle | B62K 3/12 280/231 |
| 586,991 A | 7/1897 | Curley | |
| 590,649 A | 9/1897 | Ribyn | |
| 591,270 A | 10/1897 | Gauthier | |
| 596,289 A * | 12/1897 | Smith | 280/236 |
| 611,170 A * | 9/1898 | Howard | F16H 7/1281 474/134 |
| 613,756 A * | 11/1898 | Buddle | 474/141 |
| 702,841 A * | 6/1902 | Williams | 474/141 |
| 1,835,406 A | 5/1922 | Kirsten | |
| 1,482,896 A | 2/1924 | Huntington | |
| 2,602,343 A | 12/1931 | Barrett | |
| 3,375,022 A | 3/1968 | Mark et al. | |
| 3,648,519 A | 3/1972 | Nakata | |
| 3,661,021 A | 5/1972 | Ohshita | |
| 3,956,943 A | 5/1976 | Yamasaki | |
| 3,969,947 A * | 7/1976 | Martin | F16H 55/30 474/152 |
| 4,144,773 A * | 3/1979 | Addicks | B62M 9/105 403/3 |
| 4,154,327 A | 5/1979 | Haeussinger | |
| 4,174,642 A * | 11/1979 | Martin | F16H 55/30 474/152 |
| 4,201,120 A | 5/1980 | Segawa | |
| 4,240,303 A | 12/1980 | Mosley | |
| 4,261,214 A | 4/1981 | Watanabe | |
| 4,501,575 A | 2/1985 | Lapeyre | |
| 4,576,587 A | 3/1986 | Nagano | |
| 4,608,878 A | 9/1986 | Shimano | |
| 4,727,636 A | 3/1988 | Nagano | |
| 5,192,250 A * | 3/1993 | Kobayashi | B62M 9/10 474/160 |
| 5,285,701 A | 2/1994 | Parachinni | |
| 5,759,124 A * | 6/1998 | Sung | B62M 9/12 474/152 |
| 5,876,159 A * | 3/1999 | Tseng | B23F 19/10 409/131 |
| 5,935,033 A | 8/1999 | Tseng et al. | |
| 6,013,001 A | 1/2000 | Miyoshi | |
| 6,045,472 A * | 4/2000 | Sung | B62M 9/10 474/158 |
| 6,139,456 A * | 10/2000 | Lii | B62M 9/10 474/152 |
| 6,190,275 B1 | 2/2001 | Ciancio | |
| 6,203,462 B1 | 3/2001 | Takmori | |
| 6,325,734 B1 * | 12/2001 | Young | F16H 7/06 474/156 |
| 6,340,338 B1 * | 1/2002 | Kamada | B62M 9/122 474/152 |
| 6,500,084 B2 | 12/2002 | Wigsten | |
| 6,666,786 B2 * | 12/2003 | Yahata | B62M 9/105 474/152 |
| 6,761,657 B2 * | 7/2004 | Young | F16H 7/06 474/152 |
| 7,094,170 B2 | 8/2006 | Young | |
| 7,416,500 B2 * | 8/2008 | Young | F16H 7/06 474/152 |
| 7,686,721 B2 * | 3/2010 | Tabe | B62M 9/105 474/116 |
| 7,824,287 B2 * | 11/2010 | Nonoshita | B62M 9/10 474/152 |
| 8,092,329 B2 * | 1/2012 | Wickliffe | B62M 9/105 474/160 |
| 2004/0209721 A1 * | 10/2004 | Chattin | B62M 9/10 474/160 |
| 2005/0014590 A1 * | 1/2005 | Wen | F16H 55/30 474/152 |
| 2005/0079940 A1 * | 4/2005 | Reiter | F16H 55/30 474/160 |
| 2005/0282672 A1 * | 12/2005 | Nonoshita | B62M 9/105 474/161 |
| 2006/0172840 A1 * | 8/2006 | Kamada | B62M 9/10 474/152 |
| 2006/0205549 A1 * | 9/2006 | Nonoshita | B62M 9/105 474/160 |
| 2007/0049437 A1 * | 3/2007 | Wickliffe | F16H 55/30 474/152 |
| 2007/0054768 A1 * | 3/2007 | Miyazawa | F16H 55/30 474/152 |
| 2007/0060428 A1 * | 3/2007 | Meggiolan | B62M 9/10 474/160 |
| 2007/0265122 A1 * | 11/2007 | Emura | B62M 9/105 474/152 |
| 2011/0092327 A1 | 4/2011 | Oishi | |
| 2013/0109519 A1 | 5/2013 | Morita | |
| 2013/0139642 A1 * | 6/2013 | Reiter | B62M 9/105 74/594.2 |
| 2013/0184110 A1 * | 7/2013 | Reiter | F16H 55/303 474/152 |
| 2014/0100069 A1 | 4/2014 | Reiter | |
| 2014/0221139 A1 * | 8/2014 | Choi | B62M 9/08 474/141 |

FOREIGN PATENT DOCUMENTS

| | | |
|---|---|---|
| EP | 0522984 A1 | 1/1993 |
| EP | 1489338 A2 | 12/2004 |
| GB | 825336 | 12/1959 |
| JP | S56-042489 | 9/1979 |
| JP | S58-90 | 6/1981 |
| JP | S60-104866 | 5/1985 |
| JP | S62-8181 Y2 | 1/1987 |
| JP | H01-171795 | 12/1989 |
| JP | 2164684 | 6/1990 |
| JP | 2103890 | 8/1990 |
| JP | H07-40387 | 7/1995 |
| JP | 2000-355295 | 12/2000 |
| JP | 2001-187957 | 10/2001 |
| JP | 2002-243020 | 8/2002 |
| JP | 2007-071302 | 3/2007 |
| JP | 2007-198403 | 8/2007 |
| TW | I316490 | 11/2009 |
| TW | I338655 | 2/2011 |
| WO | 9307044 A1 | 4/1993 |
| WO | 03/095867 | 11/2003 |

* cited by examiner

CHAINRING

This application is a continuation of U.S. patent application Ser. No. 13/311,735, filed Dec. 6, 2011.

BACKGROUND OF THE INVENTION

This invention relates to chainrings, and more particularly, to a solitary chainring for use with a conventional chain in a bicycle drivetrain system including a bicycle crank.

Bicycles and other chain-driven vehicles typically employ one or more chainrings and a set of rear hub mounted sprockets connected by a chain. Various mechanisms are used to maintain the chain on the chainring and sprockets. These mechanisms include chain guards, chain tensioners, chain catchers, derailleur configurations and so on.

While riding a vehicle with a chain driven drivetrain, management of the chain and chainring engagement is particularly important to safe and effective propulsion of the bicycle. Keeping the chain engaged with the chainring can be difficult, which is especially true of geared bicycles which can experience severe changes in chain tension, and energetic motion of the chain, especially from riding over rough terrain.

Moreover, the chainring in any bicycle can potentially touch the chain stay of the bicycle frame when the crank is in a position where high loads are applied by the rider, causing an elastic deformation of the bicycle frame and the crankset. This can lead to damage to the frame and chainring and cause other problems.

The invention provides an enhanced drive chain management, especially for a bicycle that can successfully and reliably be ridden over rough and challenging terrain.

SUMMARY OF THE INVENTION

The invention provides, in one aspect, a bicycle chainring for engagement with a drive chain. The bicycle chainring includes a plurality of teeth extending from a periphery of the chainring wherein roots of the plurality of teeth are disposed adjacent the periphery of the chainring. The plurality of teeth include a first group of teeth and a second group of teeth, each of the first group of teeth wider than each of the second group of teeth, and at least some of the second group of teeth arranged alternatingly and adjacently between the first group of teeth, wherein a plane bisects the chainring into an outboard side and an inboard side opposite the outboard side, and wherein the center of a top land of at least some of the first and second groups of teeth are offset from the plane in a direction toward one of the inboard and outboard sides of the chainring.

The invention also provides, in another aspect, a bicycle chainring for engagement with a drive chain. The bicycle chainring involves a plurality of teeth extending from a periphery of the chainring wherein roots of the plurality of teeth are disposed adjacent the periphery of the chainring, a rotation axis, and an outboard side and an inboard side opposite the outboard side. The plurality of teeth include a first group of teeth and a second group of teeth, each of the first group of teeth wider than each of the second group of teeth. At least some of the second group of teeth arranged alternatingly and adjacently between the first group of teeth, and wherein the center of a top land of at least some of the first and second groups of teeth are offset from the plane in a direction toward one of the inboard and outboard sides of the chainring.

These and other features and advantages of the present invention will be more fully understood from the following description of one or more embodiments of the invention, taken together with the accompanying drawings.

DETAILED DESCRIPTION OF THE PREFERRED EMBODIMENTS

Preferred embodiments of the invention will herein be described with reference to the drawings. It will be understood that the drawings and descriptions set out herein are provided for illustration only and do not limit the invention as defined by the claims appended hereto and any and all their equivalents. For example, the terms "first" and "second" or "left" and "right" are used for the sake of clarity and not as terms of limitation.

Figure 1:
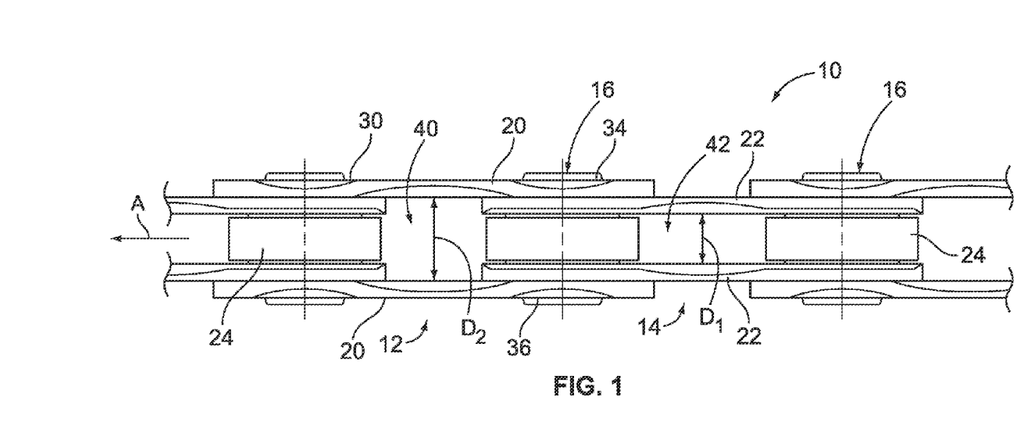
FIG. 1 is a top view of a conventional drive chain.
Figure 2:
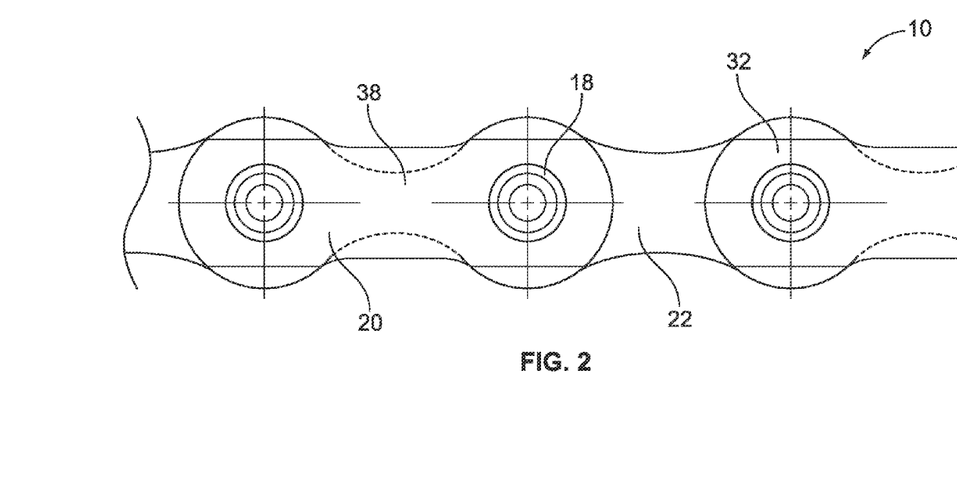
FIG. 2 is a side view of the conventional drive chain of FIG. 1.

Referring to FIGS. 1 and 2 of the drawings, numeral 10 generally indicates a conventional roller drive chain for a bicycle or any similar chain-driven device. The drive chain 10 generally includes outer chain links 12 and inner chain links 14 which are pivotally mounted on and connected to the outer chain links by pins 16, 18. The outer chain links 12 are alternatingly interleaved with the inner chain links 14.

The outer chain links 12 have paired outer link plates 20 and the inner chain links have paired inner link plates 22. Typically, rollers 24 are arranged around the pins 16, 18. The plates 20, 22 are provided with holes 30 at their ends 32. The pins 16, 18 typically extend through and project out of the holes 30, although no projection at all is considered to be optimal. The pins 16, 18 are externally riveted at their ends 34, 36 during the assembly of the roller chain 10. While the pin 16 may be made of round stock, pin 18 may be made of tube stock, as in the roller chain 10 in FIG. 2. A narrow middle part 38, which helps to determine the positioning of the roller chain 10 extends between the two circular ends 32 of each of the outer link plates 20 and the inner link plates 22.

As seen best in FIG. 1, and as viewed from above (or below) the chain, the interleaving of the outer links 12 and inner links 14 creates corresponding alternating outer link spaces 40 and inner links spaces 42. Generally, the outer link spaces 40 are openings defined by the outer link plates 20 and rollers 24. Generally, the inner link spaces 42 are openings defined by the inner link plates 22 and rollers 24.

The inner link spaces 42 are generally rectangular with the long axis of the rectangle aligned with the long axis (A) of the chain 10 (as viewed as in FIG. 1). The axial length of the inner link spaces 42 is determined by the distance between the rollers 24, while the distance between the inner link plates 22 determines the transverse spacing of the inner link spaces.

As seen in FIG. 1, the outer link spaces 40 are generally in the shape of a "cross" or in other words, a "plus." The axial length of the outer link spaces 40 is determined by the distance between the rollers 24, while the distance between the outer link plates 20 determines the transverse spacing of the outer link spaces.

It can be seen that the transverse spacing between the outer link plates 20 is greater than the spacing between the inner link plates 22. Thus, because the transverse width of the rollers 24 determines the spacing of the inner link plates 22, the rollers dictate the transverse spacing D1 of the inner link spaces 42. Similarly, since the outer link plates 20 are positioned on the pins 16 (or 18) on the outboard sides of the inner link plates 22, the transverse spacing D2 of the outer link spaces 40 is dictated by the sum of the transverse width of the rollers 24 and the thickness of two inner link plates.

Figure 3:
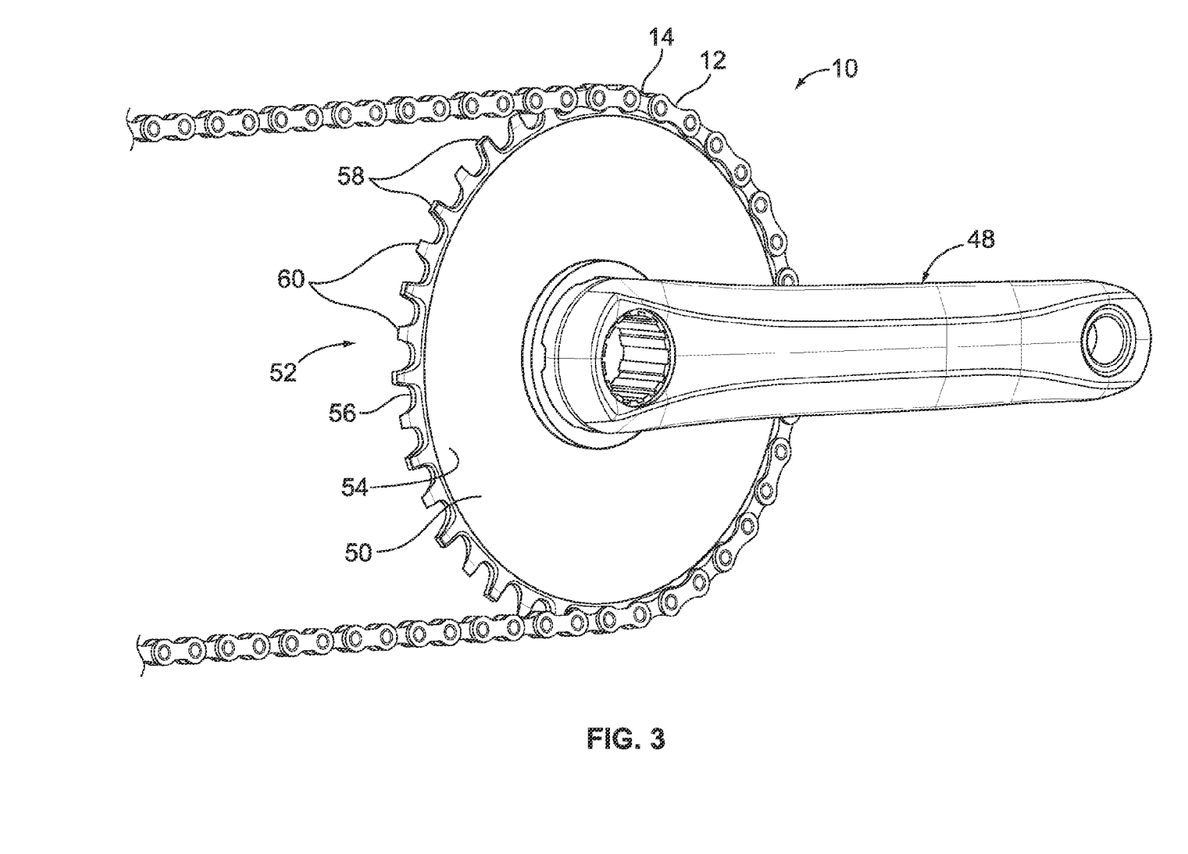
FIG. 3 is an isometric view of a combined drive chain and chainring according to the invention engaged by a drivetrain.

Referring to FIG. 3, a chainring 50 according to the invention is used with a conventional chain 10. Chainrings typically have a large plurality of teeth compared to cassettes, for example, having about 20 or more teeth. A crank or crank arm 48 is in a typical position and attached to the chain ring 50 in a well-known manner. The crank side of the chainring 50 is shown in FIG. 3, which is the outboard side 54 of the chainring. The outboard side also faces away from the vehicle to which it is attached. The opposite of the outboard side 54 of the chainring 50 is the inboard side 56. The inboard side 56 faces toward the vehicle.

Generally, force applied to the crank arm 48 (typically in a downward direction, for example) causes rotation of the chainring 50 in a like direction (clockwise). Rotation of the chainring 50 causes the chain 10 to be drawn over and advanced about the chainring.

The chainring 50 has a plurality of teeth 52 formed about the periphery 51 of the chainring, with the total number of the plurality of teeth consisting of an even number. The plurality of teeth 52 include a first group of teeth 58 and a second group of teeth 60 arranged in an alternating fashion and wherein the first group of teeth is equal in number to the second group of teeth. In a most general form, the invention provides the first group of teeth 58, that is configured to be received by and fitted into the outer link spaces 40, and a second group of teeth 60 that is configured to be received by and fitted into the inner link spaces 42.

The overall shape of the chainring periphery 51 may be generally circular or non-circular, that is elliptical, oval, polygon, or parabolic, for example. All of the examples of chainrings provided herein are shown with a circular periphery 51.

Each of the first group of teeth 58 is configured to engage with the chain 10 via an outer link space 40. Each of the second group of teeth 60 is configured to engage with the chain 10 via an inner link space 42.

Figure 12:
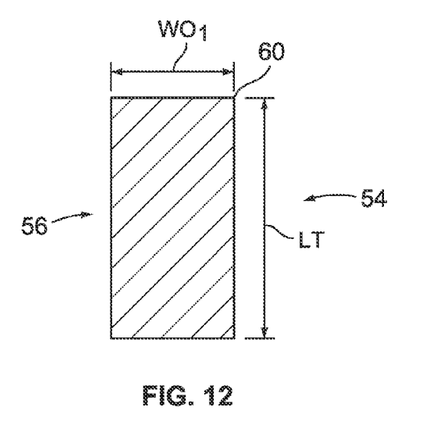
FIG. 12 is a cross sectional view through line B-B of FIG. 5 of one type of gear tooth according to one group of teeth.

Turning to FIG. 12, each of the second group of teeth 60 has a shape which in a cross sectional view is generally rectangular, particularly at or near the base or root of the tooth. The cross sectional view is taken through a plane parallel to the top land 80 of the tooth and passing through the base circle position of the tooth, i.e., about halfway between the root circle and the outside circle.

The rectangular cross section and overall width $WO_1$ of each of the second group of teeth 60 should closely match the configuration of each of the inner link spaces 42 (FIG. 1). The cross section shown of each of the second group of teeth shows that the outboard side 54 is generally planar and the inboard side 56 is also generally planar. Each of the second group of teeth 60 may fill over about 75% of the axial distance $D_1$ of a corresponding space in the chain 10. Preferably, each of the second group of teeth 60 may fill over about 80% of $D_1$ of a corresponding space in the chain 10. More preferably, each of the second group of teeth 60 may fill over about 85% of $D_1$ of a corresponding space in the chain 10.

Figure 13:
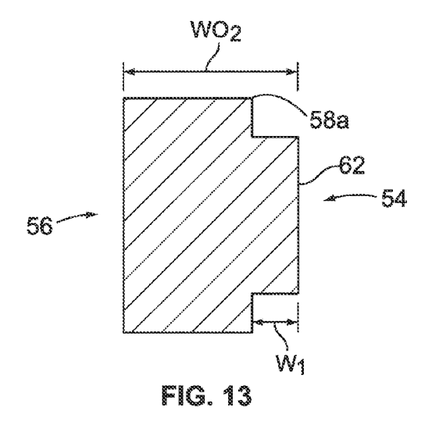
FIGS. 13-15 are cross sectional views through line A-A of FIG. 5 of alternative types of gear teeth that are different than the tooth of FIG. 12 and according to another group of teeth.
Figure 14:
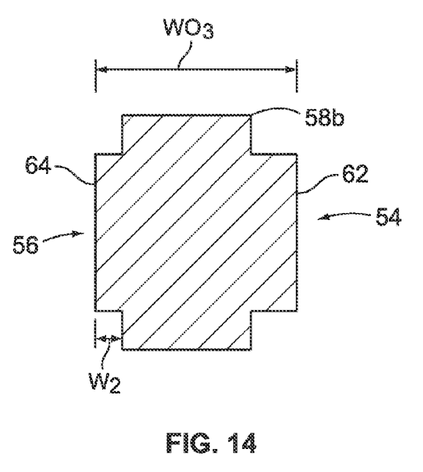
Figure 15:
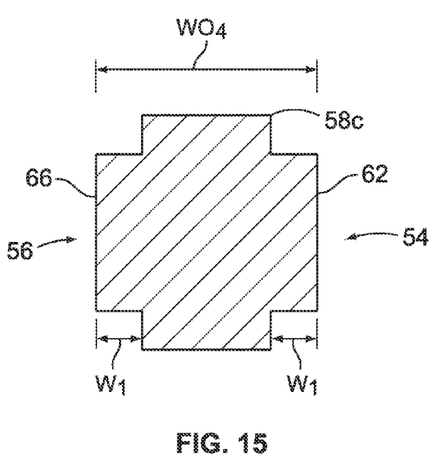

Turning to FIG. 13-15, each of the alternative versions of teeth 58a, 58b, 58c of the first group of teeth 58 (see FIG. 3) has a shape which in a cross sectional view, taken through the tooth as in FIG. 12, has the same longitudinal length $L_T$ as that of the second group of teeth 60 (FIG. 12). Each of the first group of teeth 58 may fill over about 75% of the distance $D_2$ of a corresponding space in the chain 10. Preferably, each of the first group of teeth 58 may fill over about 80% of $D_2$ of a corresponding space in the chain 10. More preferably, each of the first group of teeth 58 may fill over about 85% of $D_2$ of a corresponding space in the chain 10.

Each of the first group of teeth 58 has the additional feature of an outboard or first protrusion 62 on the outboard side 54 of each alternative teeth 58a, 58b, and 58c. FIG. 13 also demonstrates that the inboard side 56 of tooth 58a can be the same (i.e., without a protrusion) as the inboard side 56 of each of the second group of teeth 60. The first protrusion 62 is configured to fit into the corresponding part of outer link spaces 40 of chain 10 (FIG. 1) and has a width $W_1$. The protrusion 62 functions to help maintain the chain 10 on the chainring 50 (FIG. 3). The protrusion 62 causes an overall width $WO_2$ of each of teeth 58a to be greater than the overall width $WO_1$ of each of teeth 60 by the extent of protrusion 62.

FIG. 14 is another embodiment of a tooth 58b of the first group of teeth 58. In particular, tooth 58b is similar to those of FIG. 13, with the additional feature of an inboard or second protrusion 64 on the inboard side 56 of the tooth. The protrusion 64 has a width $W_2$ that is less than the width $W_1$ of the protrusion 62 of tooth 58a, or alternatively, greater than $W_1$. The protrusions 62, 64 cause an overall width $WO_3$ of each of teeth 58b to be greater than the overall width $WO_1$ of each of teeth 60 by the extent of protrusions 62, 64. Furthermore, $WO_3$ is greater than $WO_2$.

FIG. 15 is yet another embodiment of a tooth 58c of the first group of teeth 58. In particular, tooth 58c is similar to that of FIG. 14, with an inboard or second protrusion 66 on the inboard side 56 of the tooth. The protrusion 66 has a width $W_1$ that is equal to the width $W_1$ of the protrusion 62 of tooth 58a. The protrusions 62, 66 cause an overall width $WO_4$ of each of teeth 58c to be greater than the overall width $WO_1$ of each of teeth 60 by the extent of protrusions 62, 66. Furthermore, $WO_4$ is greater than $WO_3$.

It will be understood that the various configurations of the teeth 58 include protrusions that are positioned along the side or sides of each tooth in a position where they effectively function to assist in positioning the chain on the chainring 50, including positions that are adjacent or at the base of each tooth or higher on each tooth 58.

Figure 4:
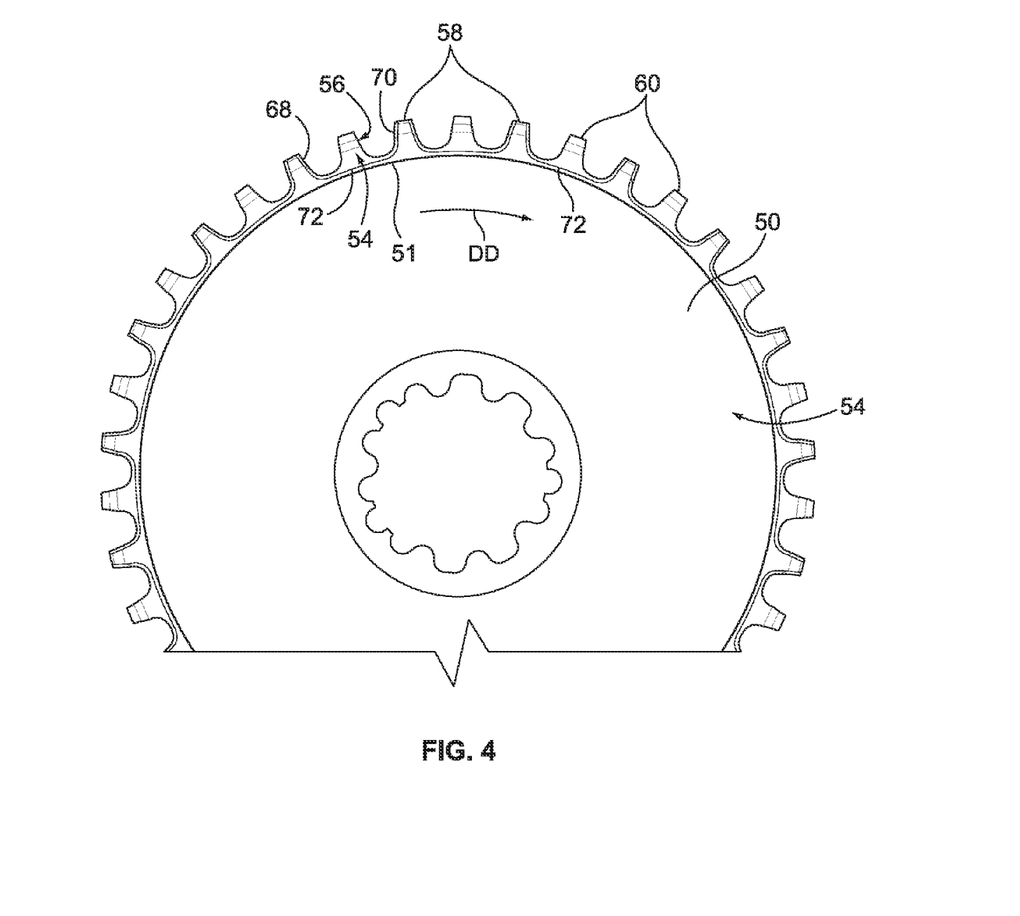
FIG. 4 is a side view of the chainring according to the invention.
Figure 6:
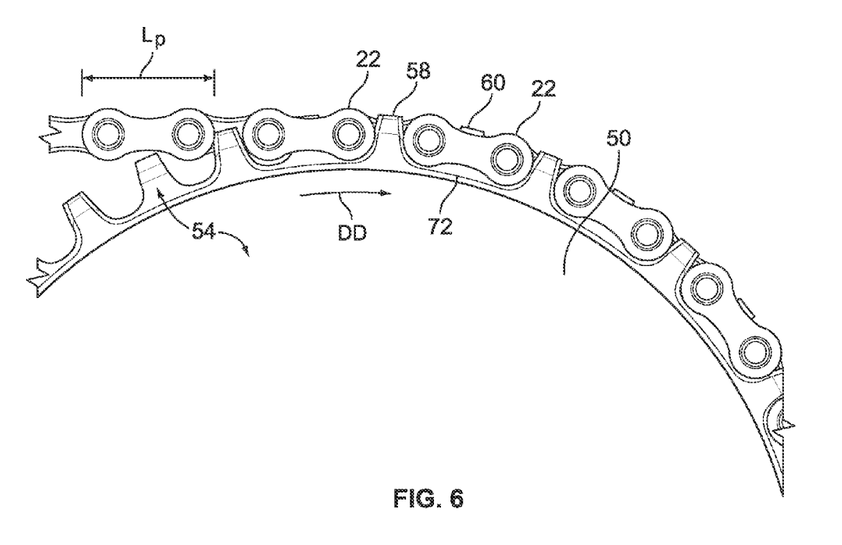
FIG. 6 is a side view of a combined drive chain and chainring according to the invention engaged by a drive chain with the outer link plates removed.

FIG. 4 and FIG. 6 is an outboard side 54 of chainring 50 and the driving direction DD. The first group of teeth 58 is alternatingly arranged with the second group of teeth 60.

The configuration of the second group of teeth 60 may be defined, with respect to the outboard and inboard sides 54, 56 of each of the teeth 60, by forming an inner link receiving recess 72 in the chainring 50 that represents material removed from the sides of the teeth 60. The inner link receiving recess 72 also serves to define the cross-sectional shape of each of the group of teeth 58. The inner link receiving recess 72 defines the outboard and inboard sides 54, 56 of each tooth and extends from the front flank 68 of one of the group of teeth 58 to a rear flank 70 of an adjacent one of the group of teeth 58 in the drive direction DD. Each inner link receiving recess 72 is configured to receive the length $L_P$ an inner link plate 22 of the chain (FIG. 6). Each recess 72 has a base surface 72a that extends in an axial direction and a wall 72b (FIG. 7) that extends radially. The base surface 72a may describe a smoothly curving contour, and may be generally in the shape of a "U".

Figure 5:
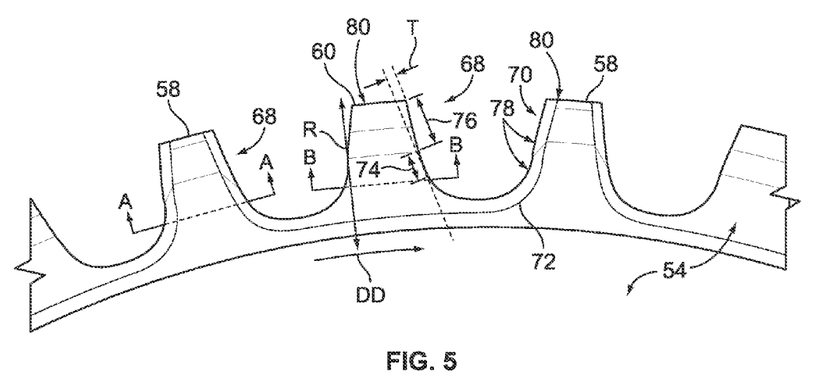
FIG. 5 is a close up of the chainring of FIG. 4.

FIG. 5 is the profile of each tooth of the teeth 58, 60 in more detail. The inner link receiving recess 72 is formed in the chainring 50 and can be seen extending along the side of each of the second group tooth 60 and extending from the load side, front or leading flank 68 of one of the group of teeth 58 to a rear flank 70 of an adjacent one of the group of teeth 58 in the drive direction DD. The recess 72 is configured to receive the length $L_P$ (FIG. 6) of an inner link plate 22. Each tooth may have a top land 80. The base surface 72a may extend to the top land 80 of each of the teeth 58. The front flank 68 of each tooth includes a contact zone 74, where a roller 24 (FIG. 1) contacts the tooth.

Above the contact zone 74 is an optional tip portion 76. The roller 24 does not contact the tip portion 76 under normal driving conditions. The tip portion 76 may protrude forwardly from a line drawn along the contact zone 74 a distance T. The protruding tip portion 76 functions to engage a chain link earlier than a chain lacking the tip portion and provides better guiding of the chain.

An optional hook feature 78 is a feature that may be formed on the rear flank 70 of each of teeth 58, 60. The hook feature 78 is positioned along the rear flank 70 and may cooperate with the tip portion 76 to provide better guiding of the chain. The hook feature 78 may include a portion of the rear flank 70 being aligned in the radial direction R.

Figure 7:
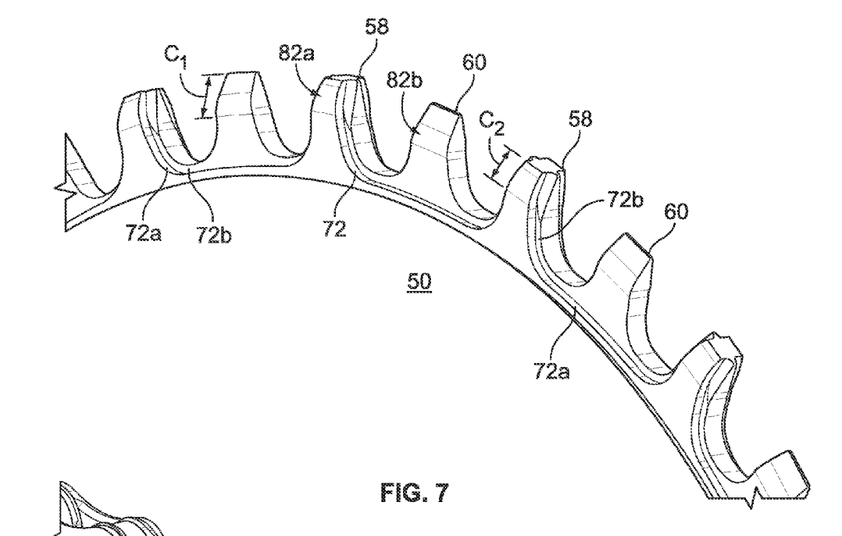
FIG. 7 is a front isometric view of the chainring according to the invention.

Turning to FIG. 7 the first group of teeth 58 and the second group of teeth 60 of the chainring 50 are arranged in an alternating fashion. An optional feature of each of the first group of teeth 58 and second group of teeth 60 is a respective outer chamfer 82a, 82b. Each of the first group of teeth 58 has an outer chamfer 82a, which may be an arcuate face formed on the outboard side 54 or shoulder of each tooth. Each of the second group of teeth 60 has an outer chamfer 82b, which may be an arcuate face formed on the outboard side 54 or shoulder of each tooth. The outer chamfer of 82b of each tooth 60 may have an extent $C_1$ that is greater relative to the extent $O_2$ of the outer chamfer 82a of each tooth 58.

Figure 8:
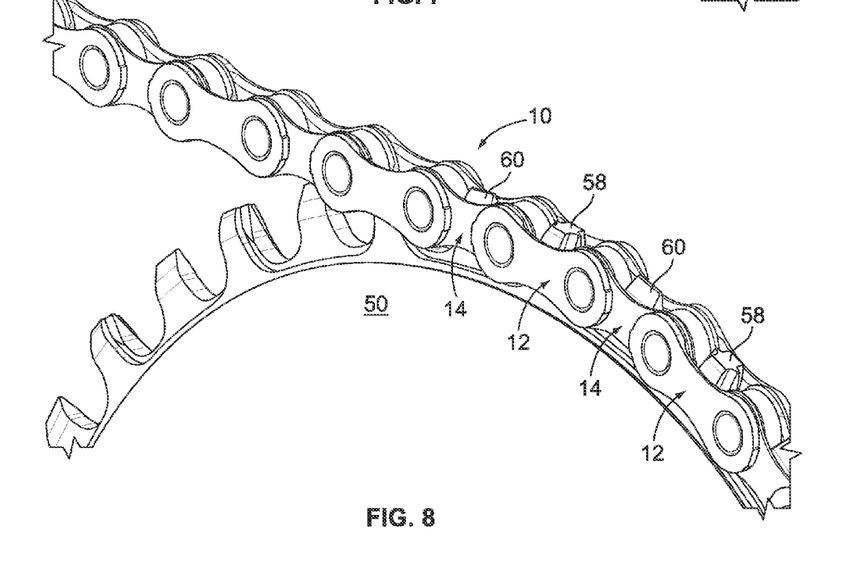
FIG. 8 is a front isometric view of the chainring according to FIG. 7, engaged by a drive chain.
Figure 9:
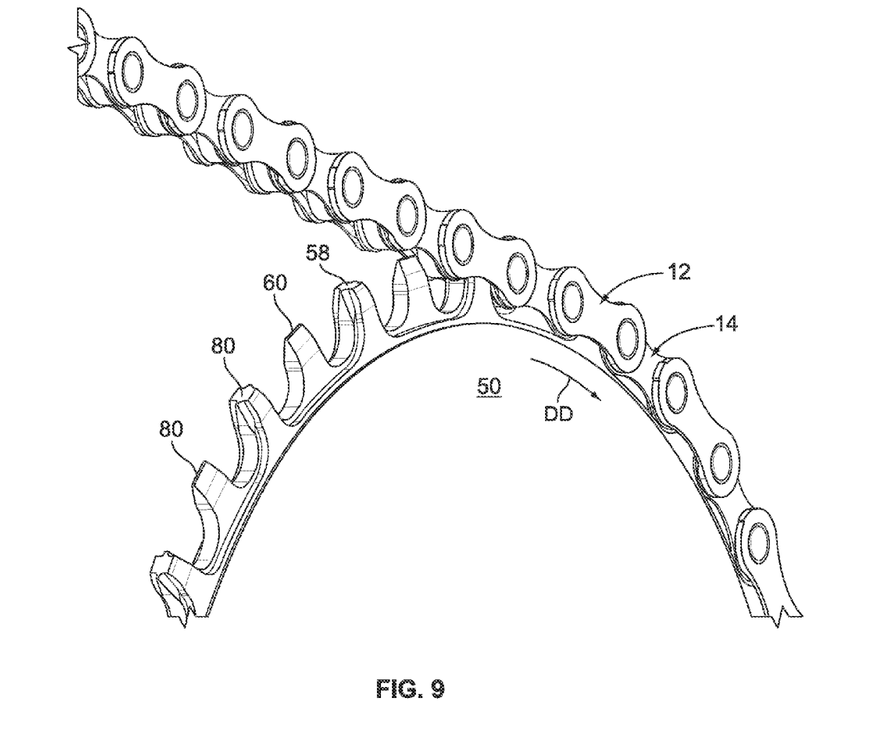
FIG. 9 is a rear isometric view of the chainring according to FIG. 7, engaged by a drive chain.

Turning to FIGS. 8 and 9 the chainring 50 includes chain 10 positioned and engaged thereon. Outer chain links 12 are positioned on the first group of teeth 58. Inner chain links 14 are positioned on the second group of teeth 60.

Figure 10:
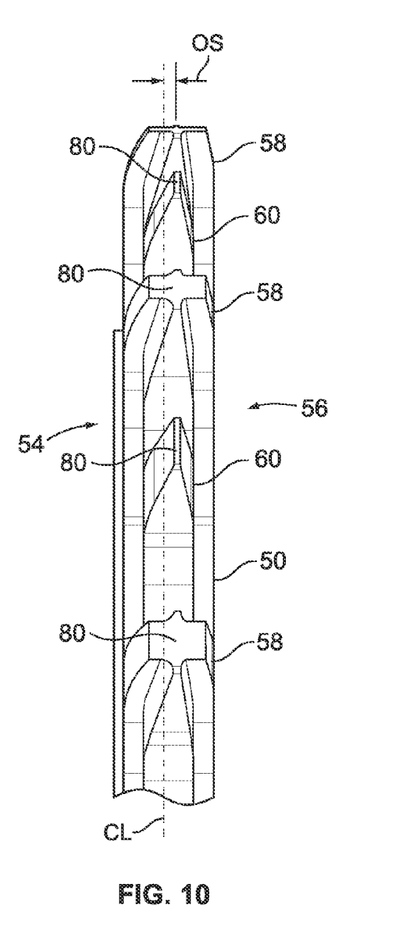
FIG. 10 is a front view of the chainring according to the invention.
Figure 11:
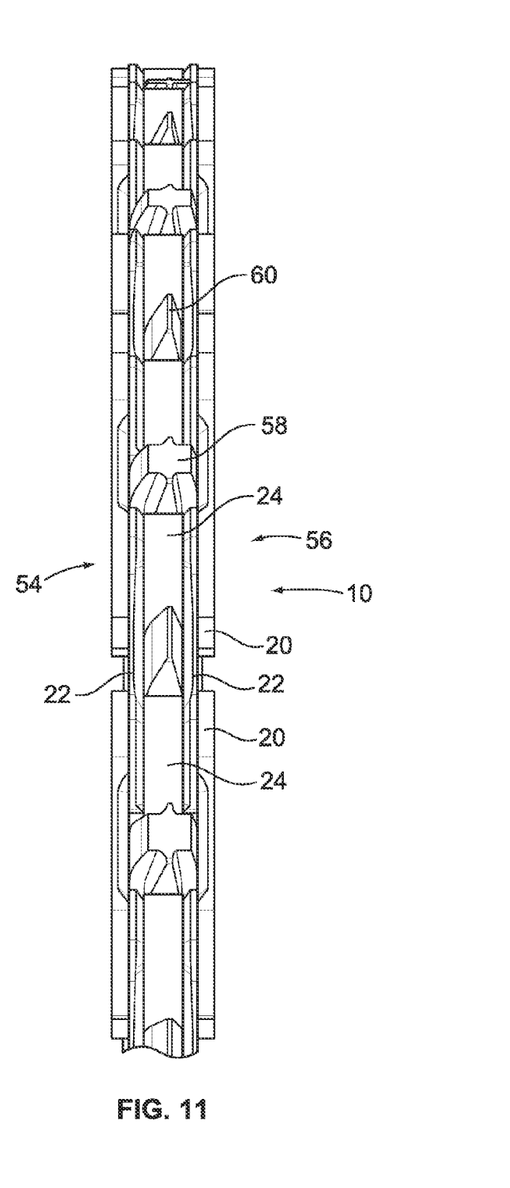
FIG. 11 is a front view of the chainring according to the invention engaged by a drive chain.

FIGS. 10 and 11 respectively is a front view of the chainring 50 without a chain 10 and with a chain. An optional feature of all of the teeth 58, 60 of the chainring 50 is an offset OS of the center of the tooth tip or top land 80 from the center line CL in a direction toward the inboard side 56 of the chainring. This offset feature provides better guiding of the chain to one side of the chainring.

Figure 16:
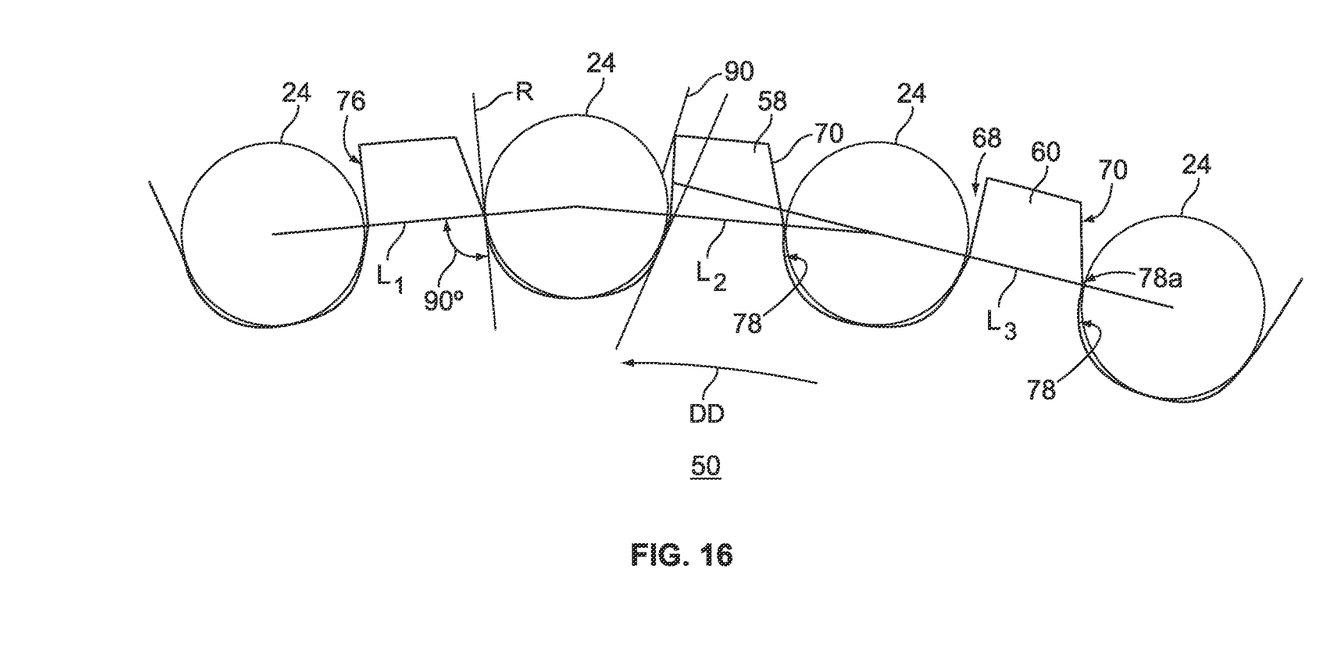
FIG. 16 is a partial side view of the chainring according to the invention with rollers of a chain engaged with the teeth of the chainring.

Turning to FIG. 16, a chainring 50 includes a number of teeth 58, 60. Link 1 of a chain engaged on the chainring 50 is represented by line $L_1$, and link 2 and link 3 are represented by lines $L_2$, $L_3$ respectively. The line of each of $L_{1-3}$ is drawn between the centers of the axis of each of the chain rollers 24.

The hook feature 78 is shown on the rear flank 70 of each of teeth 58, 60. The hook feature 78 is positioned along the rear flank 70 and may cooperate with the tip portion 76 of the front flank 68 to provide better guiding of the chain. The hook feature 78 may include a portion of the rear flank 70 being aligned in the radial direction R. The hook feature 78 has a radially outermost extent 78a where the hook feature and the link centerlines $L_{1-3}$ intersect. Alternately, the outermost extent 78a may be higher than the centerlines $L_{1-3}$, providing more room for the roller to engage the teeth in the driving direction. The curved line 90 is the path of the roller 24 when it disengages the tooth.

In use, the chain 10 is installed with each of the outer chain links 12 on one of the first group of teeth 58 and each of the inner chain links 14 on one of the second group of teeth 60. As the chainring 50 is rotated by the crank 48, the chain 10 is drawn about the chainring, and the outer chain links 12 and the inner chain links 14 are sequentially engaged with respective first and second ones of the groups of teeth 58, 60. As detailed above, the various features of the chainring 50 function to guide and maintain the chain 10 thereon.

While this invention has been described by reference to particular embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A bicycle chainring for engagement with a drive chain, comprising:
   a plurality of teeth extending from a periphery of the chainring wherein roots of the plurality of teeth are disposed adjacent the periphery of the chainring;
   the plurality of teeth including a first group of teeth and a second group of teeth, each of the first group of teeth wider than each of the second group of teeth;
   at least some of the second group of teeth arranged alternatingly and adjacently between the first group of teeth;
   wherein a plane bisects the chainring into an outboard side and an inboard side opposite the outboard side; and
   wherein the center of a top land of at least some of the first and second groups of teeth are offset from the plane in a direction toward one of the inboard and outboard sides of the chainring.

2. The bicycle chainring of claim 1, wherein each of the plurality of teeth include an outboard side and an inboard side opposite the outboard side and each of the first group of teeth include at least a first protrusion on one of the outboard side and the inboard side and each of the second group of teeth are free of the first protrusion.

3. The bicycle chainring of claim 2, wherein each of the first group of teeth includes at least a second protrusion on the other of the outboard and inboard sides.

4. The bicycle chainring of claim 3, wherein the first protrusion has a first width and the second protrusion has a second width; and
wherein the first and second protrusion widths are one of equal and unequal.

5. The bicycle chainring of claim 1, wherein the bicycle chainring is configured for engagement with a roller drive chain having alternating outer and inner chain links defining outer and inner link spaces, respectively, wherein the first group of teeth has a cross-shaped cross section adjacent a top land thereof and adjacent a base thereof;
each of the first group of teeth is sized and shaped to fit within the outer link spaces and each of the second group of teeth is sized and shaped to fit within one of the inner link spaces; and
wherein said chainring is configured to guide and maintain the drive chain thereon.

6. The bicycle chainring of claim 5, wherein the first group of teeth is wider than the inner link spaces.

7. The bicycle chainring of claim 5, wherein the second group of teeth having a rectangular-shaped cross-section adjacent a top land thereof and adjacent a base thereof.

8. The bicycle chainring of claim 1, wherein the plurality of teeth consists of an even number; and
wherein each of the first group of teeth are arranged alternatingly between the second group of teeth.

9. The bicycle chainring of claim 1, wherein the bicycle chainring is configured for engagement with a roller drive chain having alternating outer and inner chain links defining outer and inner link spaces, respectively, wherein each of the first group of teeth is sized and shaped to fit within one of the outer link spaces and each of the second group of teeth is sized and shaped to fit within one of the inner link spaces; and
wherein each of the first group of teeth fills at least 75 percent of an axial distance defined by the outer link spaces.

10. The bicycle chainring of claim 9, wherein each of the first group of teeth fills at least 80 percent of an axial distance defined by the outer link spaces.

11. The bicycle chainring of claim 10, wherein each of the first group of teeth fills at least 85 percent of an axial distance defined by the outer link spaces.

12. The bicycle chainring of claim 9, wherein each of the second group of teeth fills at least 75 percent of an axial distance defined by the inner link spaces.

13. The bicycle chainring of claim 12, wherein each of the second group of teeth fills at least 80 percent of an axial distance defined by the inner link spaces.

14. The bicycle chainring of claim 13, wherein each of the second group of teeth fills at least 85 percent of an axial distance defined by the inner link spaces.

15. The bicycle chainring of claim 1, wherein each of the plurality of teeth include an outboard side and an inboard side opposite the outboard side and one of the inboard and outboard sides of each of the second group of teeth include a link-receiving recess formed in the chainring; and
wherein each link-receiving recess is defined by a circumferentially-extending base surface that extends to a top land of each of the first group of teeth and by a radially-extending wall that extends to a top land of each of the second group of teeth.

16. A bicycle crankset including the bicycle chainring of claim 1, the bicycle crankset further comprising:
a crank arm including only the single bicycle chainring attached to the crank arm.

17. A bicycle drivetrain including the bicycle chainring of claim 1, the bicycle drivetrain further comprising:
a plurality of rear hub mounted sprockets; and
a roller drive chain connecting one of the plurality of sprockets to the chainring, the drive chain including alternating outer and inner chain links defining outer and inner link spaces, respectively.

18. The bicycle drivetrain of claim 17, further comprising:
a crank arm including only the single bicycle chainring attached to the crank arm.

19. A bicycle chainring for engagement with a drive chain, comprising:
a plurality of teeth extending from a periphery of the chainring wherein roots of the plurality of teeth are disposed adjacent the periphery of the chainring;
a rotation axis; and
an outboard side and an inboard side opposite the outboard side;
the plurality of teeth including a first group of teeth and a second group of teeth, each of the first group of teeth wider than each of the second group of teeth;
at least some of the second group of teeth arranged alternatingly and adjacently between the first group of teeth; and
wherein the center of a top land of at least some of the first and second groups of teeth are offset from the plane in a direction toward one of the inboard and outboard sides of the chainring.

20. The bicycle chainring of claim 19 wherein the outboard side is the outermost side of the chainring and the inboard side is the innermost side of the chainring.

21. The bicycle chainring of claim 19, wherein the bicycle chainring is configured for engagement with a roller drive chain having alternating outer and inner chain links defining outer and inner link spaces, respectively, wherein each of the first group of teeth is sized and shaped to fit within one of the outer link spaces and each of the second group of teeth is sized and shaped to fit within one of the inner link spaces; and
wherein each of the first group of teeth fills at least 75 percent of an axial distance defined by the outer link spaces.

22. The bicycle chainring of claim 21, wherein each of the first group of teeth fills at least 80 percent of an axial distance defined by the outer link spaces.

23. The bicycle chainring of claim 22, wherein each of the first group of teeth fills at least 85 percent of an axial distance defined by the outer link spaces.

24. The bicycle chainring of claim 21, wherein each of the second group of teeth fills at least 75 percent of an axial distance defined by the inner link spaces.

25. The bicycle chainring of claim 24, wherein each of the second group of teeth fills at least 80 percent of an axial distance defined by the inner link spaces.

26. The bicycle chainring of claim 25, wherein each of the second group of teeth fills at least 85 percent of an axial distance defined by the inner link spaces.

27. A bicycle crankset including the bicycle chainring of claim 19, the bicycle crankset further comprising:
a crank arm including only the single bicycle chainring attached to the crank arm.

28. A bicycle drivetrain including the bicycle chainring of claim 19, the bicycle drivetrain further comprising:
- a plurality of rear hub mounted sprockets; and
- a roller drive chain connecting one of the plurality of sprockets to the chainring, the drive chain including alternating outer and inner chain links defining outer and inner link spaces, respectively.

\* \* \* \* \*

(12) EX PARTE REEXAMINATION CERTIFICATE (11457th)
United States Patent
Reiter et al.

(10) Number: US 9,731,790 C1
(45) Certificate Issued: Feb. 11, 2019

(54) CHAINRING

(71) Applicant: SRAM, LLC, Chicago, IL (US)

(72) Inventors: Markus Reiter, Schweinfurt (DE); Raymond Florczyk, Schwebheim (DE); Henrik Braedt, Gebrunn (DE)

(73) Assignee: SRAM, LLC, Chicago, IL (US)

Reexamination Request:
No. 90/014,005, Aug. 25, 2017

Reexamination Certificate for:
Patent No.: 9,731,790
Issued: Aug. 15, 2017
Appl. No.: 14/929,892
Filed: Nov. 2, 2015

Related U.S. Application Data

(63) Continuation of application No. 13/311,735, filed on Dec. 6, 2011, now Pat. No. 9,182,027.

(51) Int. Cl.
| | |
|---|---|
| *B62M 1/36* | (2013.01) |
| *B62M 9/00* | (2006.01) |
| *B62M 9/08* | (2006.01) |
| *B62M 9/10* | (2006.01) |
| *F16H 55/30* | (2006.01) |
| *F16H 7/06* | (2006.01) |

(52) U.S. Cl.
CPC .............. *B62M 9/105* (2013.01); *B62M 1/36* (2013.01); *B62M 9/00* (2013.01); *B62M 9/08* (2013.01); *F16H 55/30* (2013.01); *F16H 55/303* (2013.01); *B62M 2009/002* (2013.01); *Y10T 74/2165* (2015.01)

(58) Field of Classification Search
CPC ...................................................... F16H 55/30
See application file for complete search history.

(56) References Cited

To view the complete listing of prior art documents cited during the proceeding for Reexamination Control Number 90/014,005, please refer to the USPTO's public Patent Application Information Retrieval (PAIR) system under the Display References tab.

*Primary Examiner* — William C Doerrler

(57) ABSTRACT

A bicycle chainring includes a plurality of teeth extending from a periphery of the chainring wherein roots of the plurality of teeth are disposed adjacent the periphery of the chainring. The plurality of teeth include a first group of teeth and a second group of teeth, each of the first group of teeth wider than each of the second group of teeth, and at least some of the second group of teeth arranged alternatingly and adjacently between the first group of teeth, wherein the center of a top land of at least some of the first and second groups of teeth are offset from a plane in a direction toward one of the inboard and outboard sides of the chainring.

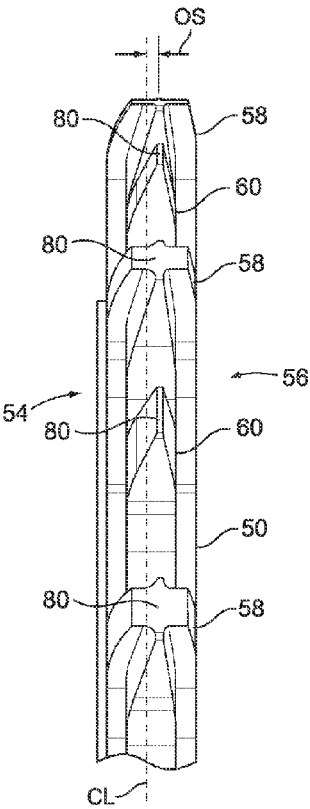

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 5-8, 15, 19 and 20 are determined to be patentable as amended.

Claims 3, 4, 9-14, 16-18 and 21-28, dependent on an amended claim, are determined to be patentable.

New claims 29-56 are added and determined to be patentable.

1. A bicycle chainring for engagement with a drive chain, comprising:
 a plurality of teeth extending from a periphery of the chainring wherein roots of the plurality of teeth are disposed adjacent the periphery of the chainring;
 the plurality of teeth including a first group of teeth and a second group of teeth, each of the first group of teeth wider than each of the second group of teeth;
 at least some of the second group of teeth arranged alternatingly and adjacently between the first group of teeth;
 wherein a plane bisects the chainring into an outboard side and an inboard side opposite the outboard side; and
 wherein the center of a top land of at least some of the first and second groups of teeth [are] *is* offset from the plane in a direction toward one of the inboard and outboard sides of the chainring.

2. The bicycle chainring of claim 1, wherein each of the plurality of teeth [include] *includes* an outboard side and an inboard side opposite the outboard side and each of the first group of teeth [include] *includes* at least a first protrusion on one of the outboard side and the inboard side and each of the second group of teeth are free of the first protrusion.

5. The bicycle chainring of claim 1, wherein the bicycle chainring is configured for engagement with a roller drive chain having alternating outer and inner chain links defining outer and inner link spaces, respectively, wherein *each of* the first group of teeth has a cross-shaped cross section adjacent a top land thereof and adjacent a base thereof;
 each of the first group of teeth is sized and shaped to fit within the outer link spaces and each of the second group of teeth is sized and shaped to fit within one of the inner link spaces; and
 wherein said chainring is configured to guide and maintain the drive chain thereon.

6. The bicycle chainring of claim 5, wherein *each of* the first group of teeth is wider than the inner link spaces.

7. The bicycle chainring of claim 5, wherein *each of* the second group of teeth [having] *has* a rectangular-shaped cross-section adjacent a top land thereof and adjacent a base thereof.

8. The bicycle chainring of claim 1, wherein the plurality of teeth consists of an even number; and
 wherein each of the first group of teeth [are] *is* arranged alternatingly between the second group of teeth.

15. The bicycle chainring of claim 1, wherein each of the plurality of teeth [include] *includes* an outboard side and an inboard side opposite the outboard side and one of the inboard and outboard sides of each of the second group of teeth [include] *includes* a link-receiving recess foiiiied in the chainring; and
 wherein each link-receiving recess is defined by a circumferentially-extending base surface that extends to a top land of each of the first group of teeth and by a radially-extending wall that extends to a top land of each of the second group of teeth.

19. A bicycle chainring for engagement with a drive chain, comprising:
 a plurality of teeth extending from a periphery of the chainring wherein roots of the plurality of teeth are disposed adjacent the periphery of the chainring;
 a rotation axis; [and]
 *wherein a plane perpendicular to said rotation axis bisects the chainring into* an outboard side and an inboard side opposite the outboard side;
 the plurality of teeth including a first group of teeth and a second group of teeth, each of the first group of teeth wider than each of the second group of teeth;
 at least some of the second group of teeth arranged alternatingly and adjacently between the first group of teeth; and
 wherein the center of a top land of at least some of the first and second groups of teeth [are] *is* offset from the plane in a direction toward one of the inboard and outboard sides of the chainring.

20. The bicycle chainring of claim 19, wherein the outboard side is the outermost side of the chainring and the inboard side is the innermost side of the chainring.

*29. A bicycle chainring for engagement with a drive chain, comprising:*
 *a plurality of teeth extending from a periphery of the chainring wherein roots of the plurality of teeth are disposed adjacent the periphery of the chainring;*
 *the plurality of teeth including a first group of teeth and a second group of teeth, each of the first group of teeth wider than each of the second group of teeth;*
 *at least some of the second group of teeth arranged alternatingly and adjacently between the first group of teeth;*
 *wherein a plane bisects the chainring into an outboard side and an inboard side opposite the outboard side; and*
 *wherein the center of a top land of each of the first and second groups of teeth is offset from the plane in a direction toward one of the inboard and outboard sides of the chainring.*

*30. The bicycle chainring of claim 29, wherein each of the plurality of teeth includes an outboard side and an inboard side opposite the outboard side and each of the first group of teeth includes at least a first protrusion on one of the outboard side and the inboard side and each of the second group of teeth is free of the first protrusion.*

*31. The bicycle chainring of claim 30, wherein each of the first group of teeth includes at least a second protrusion on the other of the outboard and inboard sides.*

*32. The bicycle chainring of claim 31, wherein the first protrusion has a first width and the second protrusion has a second width; and*
 *wherein the first and second protrusion widths are one of equal and unequal.*

*33. The bicycle chainring of claim 28, wherein the bicycle chainring is configured for engagement with a roller drive* chain having alternating outer and inner chain links defining outer and inner link spaces, respectively, wherein each of the first group of teeth has a cross-shaped cross section adjacent a top land thereof and adjacent a base thereof;
> each of the first group of teeth is sized and shaped to fit within the outer link spaces and each of the second group of teeth is sized and shaped to fit within one of the inner link spaces; and
> wherein said chainring is configured to guide and maintain the drive chain thereon.

34. The bicycle chainring of claim 33, wherein each of the first group of teeth is wider than the inner link spaces.

35. The bicycle chainring of claim 33, wherein each of the second group of teeth has a rectangular-shaped cross-section adjacent a top land thereof and adjacent a base thereof.

36. The bicycle chainring of claim 28, wherein the plurality of teeth consists of an even number; and
> wherein each of the first group of teeth is arranged alternatingly between the second group of teeth.

37. The bicycle chainring of claim 28, wherein the bicycle chainring is configured for engagement with a roller drive chain having alternating outer and inner chain links defining outer and inner link spaces, respectively, wherein each of the first group of teeth is sized and shaped to fit within one of the outer link spaces and each of the second group of teeth is sized and shaped to fit within one of the inner link spaces; and
> wherein each of the first group of teeth fills at least 75 percent of an axial distance defined by the outer link spaces.

38. The bicycle chainring of claim 37, wherein each of the first group of teeth fills at least 80 percent of an axial distance defined by the outer link spaces.

39. The bicycle chainring of claim 38, wherein each of the first group of teeth fills at least 85 percent of an axial distance defined by the outer link spaces.

40. The bicycle chainring of claim 37, wherein each of the second group of teeth fills at least 75 percent of an axial distance defined by the inner link spaces.

41. The bicycle chainring of claim 40, wherein each of the second group of teeth fills at least 80 percent of an axial distance defined by the inner link spaces.

42. The bicycle chainring of claim 41, wherein each of the second group of teeth fills at least 85 percent of an axial distance defined by the inner link spaces.

43. The bicycle chainring of claim 28, wherein each of the plurality of teeth includes an outboard side and an inboard side opposite the outboard side and one of the inboard and outboard sides of each of the second group of teeth includes a link-receiving recess formed in the chainring; and
> wherein each link-receiving recess is defined by a circumferentially-extending base surface that extends to a top land of each of the first group of teeth and by a radially-extending wall that extends to a top land of each of the second group of teeth.

44. A bicycle crankset including the bicycle chainring of claim 28, the bicycle crankset further comprising:
> a crank arm including only the single bicycle chainring attached to the crank arm.

45. A bicycle drivetrain including the bicycle chainring of claim 28, the bicycle drivetrain further comprising:
> a plurality of rear hub mounted sprockets; and
> a roller drive chain connecting one of the plurality of sprockets to the chainring, the drive chain including alternating outer and inner chain links defining outer and inner link spaces, respectively.

46. The bicycle drivetrain of claim 45, further comprising:
> a crank arm including only the single bicycle chainring attached to the crank arm.

47. A bicycle chainring for engagement with a drive chain, comprising:
> a plurality of teeth extending from a periphery of the chainring wherein roots of the plurality of teeth are disposed adjacent the periphery of the chainring;
> a rotation axis;
> wherein a plane perpendicular to said rotation axis bisects the chainring into an outboard side and an inboard side opposite the outboard side;
> the plurality of teeth including a first group of teeth and a second group of teeth, each of the first group of teeth wider than each of the second group of teeth;
> at least some of the second group of teeth arranged alternatingly and adjacently between the first group of teeth; and
> wherein the center of a top land of each of the first and second groups of teeth is offset from the plane in a direction toward one of the inboard and outboard sides of the chainring.

48. The bicycle chainring of claim 47, wherein the outboard side is the outermost side of the chainring and the inboard side is the innermost side of the chainring.

49. The bicycle chainring of claim 48, wherein the bicycle chainring is configured for engagement with a roller drive chain having alternating outer and inner chain links defining outer and inner link spaces, respectively, wherein each of the first group of teeth is sized and shaped to fit within one of the outer link spaces and each of the second group of teeth is sized and shaped to fit within one of the inner link spaces; and
> wherein each of the first group of teeth fills at least 75 percent of an axial distance defined by the outer link spaces.

50. The bicycle chainring of claim 49, wherein each of the first group of teeth fills at least 80 percent of an axial distance defined by the outer link spaces.

51. The bicycle chainring of claim 50, wherein each of the first group of teeth fills at least 85 percent of an axial distance defined by the outer link spaces.

52. The bicycle chainring of claim 47, wherein each of the second group of teeth fills at least 75 percent of an axial distance defined by the inner link spaces.

53. The bicycle chainring of claim 52, wherein each of the second group of teeth fills at least 80 percent of an axial distance defined by the inner link spaces.

54. The bicycle chainring of claim 53, wherein each of the second group of teeth fills at least 85 percent of an axial distance defined by the inner link spaces.

55. A bicycle crankset including the bicycle chainring of claim 47, the bicycle crankset further comprising:
> a crank arm including only the single bicycle chainring attached to the crank arm.

56. A bicycle drivetrain including the bicycle chainring of claim 47, the bicycle drivetrain further comprising:
> a plurality of rear hub mounted sprockets; and
> a roller drive chain connecting one of the plurality of sprockets to the chainring, the drive chain including alternating outer and inner chain links defining outer and inner link spaces, respectively.

* * * * *